US009602012B2

(12) United States Patent
Kawashima

(10) Patent No.: US 9,602,012 B2
(45) Date of Patent: Mar. 21, 2017

(54) APPARATUS AND METHOD FOR CONTROLLING SWITCHING POWER SUPPLY

(71) Applicant: FUJI ELECTRIC CO., LTD., Kawasaki-shi (JP)

(72) Inventor: Tetsuya Kawashima, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 0 days.

(21) Appl. No.: 15/149,496

(22) Filed: May 9, 2016

(65) Prior Publication Data

US 2016/0373011 A1 Dec. 22, 2016

(30) Foreign Application Priority Data

Jun. 17, 2015 (JP) ................................. 2015-122171

(51) Int. Cl.
*H02M 3/335* (2006.01)
*H02M 1/32* (2007.01)

(52) U.S. Cl.
CPC ......... *H02M 3/33507* (2013.01); *H02M 1/32* (2013.01)

(58) Field of Classification Search
CPC ......... H02M 3/33523; H02M 3/33507; H02M 1/32; H02M 2001/0009
See application file for complete search history.

(56) References Cited

U.S. PATENT DOCUMENTS

2009/0021968 A1* 1/2009 Komatsu ........... H02M 3/33507 363/126
2010/0194463 A1* 8/2010 Moon ..................... H02M 1/32 327/427
2010/0246216 A1* 9/2010 Coulson ........... H02M 3/33523 363/21.12
2011/0090718 A1* 4/2011 Morota ............ H02M 3/33523 363/21.12

(Continued)

FOREIGN PATENT DOCUMENTS

JP 2010-521954 A 6/2010
JP 2011-091925 A 5/2011

(Continued)

*Primary Examiner* — Adolf Berhane
*Assistant Examiner* — Henry Lee, III
(74) *Attorney, Agent, or Firm* — Rabin & Berdo, P.C.

(57) ABSTRACT

An output voltage error detection unit outputs an auxiliary winding voltage generated across an auxiliary winding having the same number of turns as a secondary winding a certain period after a secondary conduction period starts. A correction amount calculation unit calculates a secondary voltage drop caused by a secondary current flowing in the conduction period based on a primary current flowing when the conduction period starts and outputs a calculation result as a correction amount. A reference voltage generation unit generates a reference voltage by adding the correction amount to the output voltage. A control unit generates a feedback signal to minimize the error between the auxiliary winding voltage obtained after a certain delay period and the reference voltage. A PWM signal generation unit controls a PWM signal based on the feedback signal, adjusts switching of the switching element, and maintains the output voltage at a constant level.

12 Claims, 13 Drawing Sheets

(56) References Cited

U.S. PATENT DOCUMENTS

| | | | | |
|---|---|---|---|---|
| 2013/0141946 | A1* | 6/2013 | Sakurai ............ | H02M 3/33523 363/21.16 |
| 2015/0244273 | A1* | 8/2015 | Schaemann ....... | H02M 3/33523 363/21.18 |
| 2015/0249390 | A1* | 9/2015 | Fahlenkamp ..... | H02M 3/33507 363/21.15 |

FOREIGN PATENT DOCUMENTS

| | | | |
|---|---|---|---|
| JP | 2013-121214 | A | 6/2013 |
| WO | WO-2007/088803 | A1 | 8/2007 |
| WO | WO-2008/116342 | A1 | 10/2008 |

* cited by examiner

CCM MODE

APPARATUS AND METHOD FOR CONTROLLING SWITCHING POWER SUPPLY

CROSS-REFERENCE TO RELATED APPLICATION

This application is based upon, and claims the benefit of priority of, the prior Japanese Patent Application No. 2015-122171, filed on Jun. 17, 2015, the entire contents of which are incorporated herein by reference.

BACKGROUND OF THE INVENTION

1. Field of the Invention

The embodiments discussed herein relate to an apparatus and a method for controlling a switching power supply.

2. Background of the Related Art

Many switching power supplies use a flyback topology for the alternate current (AC)/direct current (DC) converter.

Such a flyback switching power supply includes a transformer and a switching transistor such as a metal oxide semiconductor field effect transistor (MOSFET), causes a diode bridge to rectify an AC input voltage, and obtains a desired DC output voltage from the rectified voltage.

In addition, such an AC/DC converter is provided with a control circuit to supply a stable output voltage even when, for example, the AC input voltage, the load, or the temperature changes.

The control circuit is arranged on the primary side of the transformer. On the basis of information about the output voltage on the secondary side of the transformer, the control circuit performs feedback control on the switching of the MOSFET and maintains the output voltage at a constant level.

For the transmission of this output voltage information from the secondary side to the primary side, conventional flyback switching power supplies use an insulating element such as an output voltage error amplifier (a shunt regulator) or a photocoupler.

However, to reduce the cost, the number of parts, etc., power supplies that do not use such an output error amplifier or photocoupler have recently been developed. These power supplies perform feedback control on the output voltage by using a voltage that occurs across an auxiliary winding of the transformer and are referred to as primary-side-control flyback power supplies.

For example, according to a conventional technique for such a primary-side-control flyback power supply, the output voltage is controlled by detecting the primary voltage and correcting the voltage lost from the secondary voltage when the secondary current reaches zero, for example (Japanese National Publication of International Patent Application No. 2010-521954).

According to another conventional technique, a voltage that occurs across an auxiliary winding is detected and compared with a reference value, and a detection period is determined based on the comparison result. In addition, the detected voltage is sampled by using two pulses within the detection period, and one of the detected voltages is outputted (Japanese Laid-open Patent Publication No. 2013-121214).

A flyback power supply performs a control operation so that the output voltage has a desired value. A primary-side-control flyback power supply also includes a transformer having an auxiliary winding. Ideally, the primary-side-control flyback power supply obtains a voltage that corresponds to the output voltage from the auxiliary winding and controls the output voltage on the basis of the obtained voltage. More specifically, for example, the secondary winding and the auxiliary winding of the transformer are formed to have the same number of turns. A voltage that corresponds to the output voltage is generated across the auxiliary winding, and the voltage that occurs across the auxiliary winding in a secondary conduction period is detected. In addition, the output voltage is controlled by using a pulse width modulation (PWM) control circuit.

However, in reality, since a voltage drop is caused by a diode and the like arranged on the secondary side, the output voltage is changed from its target value, and an error is caused.

Thus, a control circuit for a simple primary-side-control flyback power supply does not perform the above error correction and is used when a high degree of accuracy is not needed. Meanwhile, means for correcting this error has also been proposed. For example, Japanese National Publication of International Patent Application No. 2010-521954 discusses sampling an auxiliary winding voltage a plurality of times in a secondary conduction period and performing a control operation by using a sampling result obtained immediately before the secondary current reaches zero and the auxiliary winding voltage begins to decrease. As another example, as discussed in U.S. Patent Application Publication No. 2010/0246216, there is known a technique in which the slope of an auxiliary winding voltage over time is monitored. According to this technique, a control operation is performed by using the auxiliary winding voltage when the secondary voltage reaches zero and the slope of the auxiliary winding voltage significantly changes. According to any of these techniques, the secondary current is determined to have reached zero by detecting when the auxiliary voltage begins to sharply decrease, and a control operation is performed by using an auxiliary winding voltage immediately before this timing.

In an operation in a discontinuous current mode (DCM) in which the secondary current reaches zero per switching period, these conventional techniques achieve accurate output control while eliminating the voltage lost on the secondary side. However, when the input voltage is low or the load current is large, an operation in a continuous current mode (CCM) could occur. In such a case, the secondary current has not reached zero when the auxiliary winding voltage begins to sharply decrease. Thus, according to the above conventional techniques, the error caused by the loss on the secondary side cannot completely be eliminated.

SUMMARY OF THE INVENTION

According to one aspect, there is provided an apparatus for controlling a switching power supply that causes a transformer to convert an input voltage on a primary side into a direct-current output voltage on a secondary side based on switching of a switching element and supply the output voltage to load, the apparatus including: an output voltage error detection unit configured to output an auxiliary winding voltage generated across an auxiliary winding having the same number of turns as a secondary winding of the transformer a certain period after a secondary conduction period of the transformer starts; a correction amount calculation unit configured to calculate a secondary voltage drop caused by a secondary current flowing in the secondary conduction period based on a primary current flowing through the switching element arranged on the primary side when the secondary conduction period starts and output a result of the calculation as a correction amount to be added to a target value for the output voltage; a reference voltage generation unit configured to generate a reference voltage by adding a voltage corresponding to the correction amount to a target voltage for the output voltage; a control unit configured to perform feedback control to minimize an error between the auxiliary winding voltage obtained after a certain delay period and the reference voltage and generate a feedback signal; and a pulse width modulation (PWM) control unit configured to control a PWM signal based on the feedback signal, adjust switching of the switching element, and perform a control operation to maintain the output voltage at a constant level.

The object and advantages of the invention will be realized and attained by means of the elements and combinations particularly pointed out in the claims.

It is to be understood that both the foregoing general description and the following detailed description are exemplary and explanatory and are not restrictive of the invention.

DETAILED DESCRIPTION OF THE INVENTION

Figure 1:
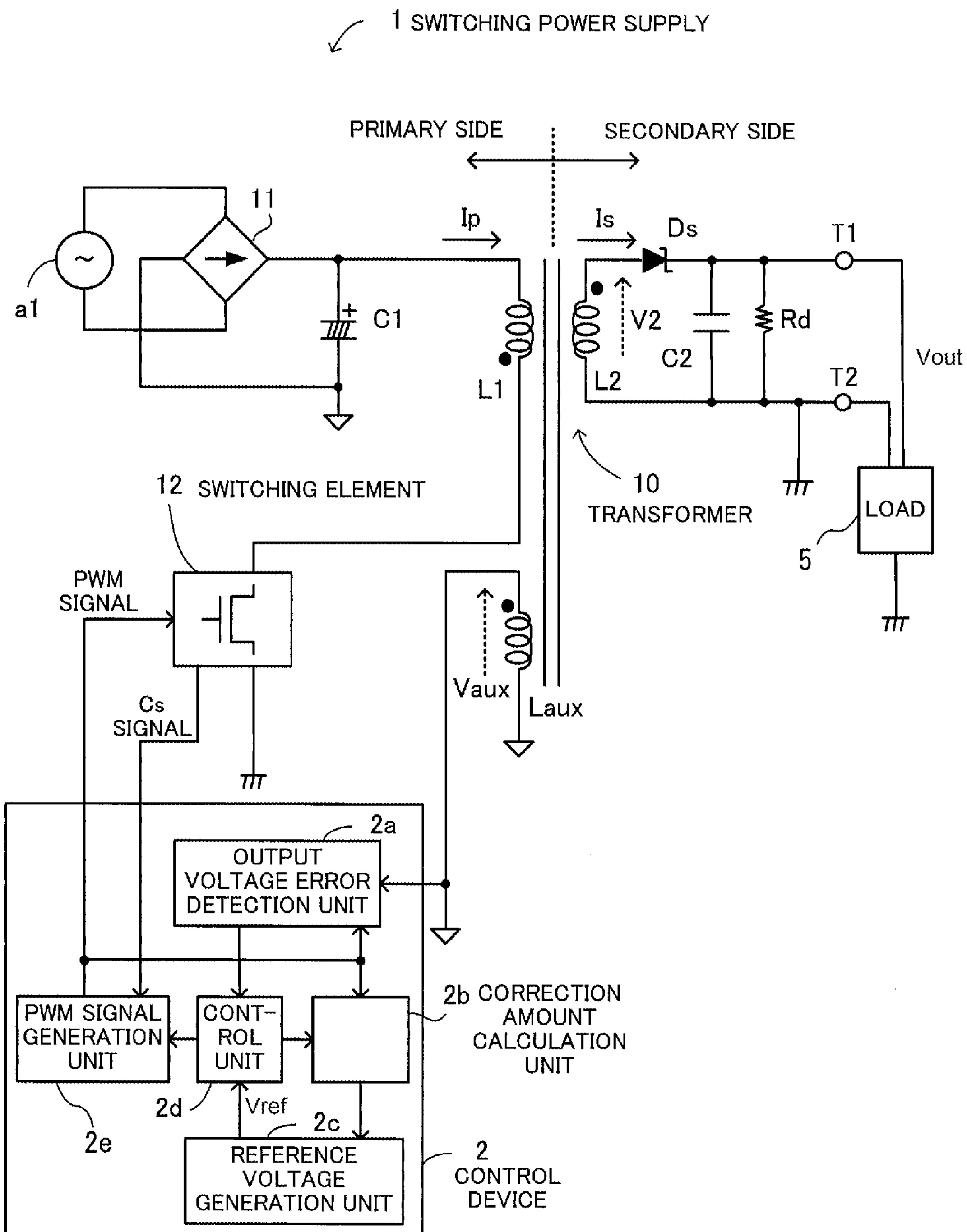
FIG. 1 illustrates an example of a configuration of a switching power supply.

Embodiments will be described below with reference to the accompanying drawings, wherein like reference characters refer to like elements throughout. FIG. 1 illustrates an example of a configuration of a switching power supply 1. The switching power supply 1 includes a transformer 10, a bridge circuit 11, a switching element 12, an input capacitor C1, a diode Ds, an output capacitor C2, a resistor Rd, and a control device 2.

The bridge circuit 11 rectifies an AC voltage outputted from an AC voltage source al. The input capacitor C1 smoothes and converts the rectified voltage into a DC voltage.

The transformer 10 includes a primary winding L1, a secondary winding L2, and an auxiliary winding Laux and transmits the energy generated on the primary side to the secondary side. The diode Ds rectifies the voltage generated by the secondary winding L2.

The output capacitor C2 smoothes the rectified voltage. The smoothed voltage is applied to a load 5 connected to output terminals of the switching power supply 1. The resistor Rd is for discharging an electric current so that the output voltage is not excessively increased under a no-load condition. The resistor Rd is what is called a bleeder resistor.

The auxiliary winding Laux is a winding wound in the same way as the secondary winding L2, and an auxiliary winding voltage Vaux generated across the auxiliary winding Laux is transmitted to the control device 2. A signal Cs is a voltage corresponding to the primary current flowing through the switching element 12 and is also transmitted to the control device 2.

The control device 2 includes an output voltage error detection unit 2*a*, a correction amount calculation unit 2*b*, a reference voltage generation unit 2*c*, a control unit 2*d*, and a PWM signal generation unit 2*e*.

The output voltage error detection unit 2*a* samples, holds, and outputs the auxiliary winding voltage Vaux generated across the auxiliary winding Laux having the same number of turns as the secondary winding L2 of the transformer 10 a certain period after the secondary conduction period of the transformer 10 starts.

The correction amount calculation unit 2*b* calculates a voltage corresponding to a voltage drop from a secondary voltage V2 to a voltage across the output voltage terminals T1 and T2, the secondary voltage V2 generated by a secondary current Is flowing in a secondary conduction period, based on a primary current Ip flowing through the switching element 12 arranged on the primary side when the secondary conduction period starts and outputs a result of the calculation as a correction amount added to a target value for the output voltage.

The reference voltage generation unit 2*c* generates a reference voltage Vref obtained by adding a voltage corresponding to the correction amount to the target voltage value for the output voltage at terminals T1 and T2. The control unit 2*d* generates a feedback signal (a voltage) to minimize the error between the auxiliary winding voltage outputted after a certain delay period from the output voltage error detection unit 2*a* and the reference voltage Vref. The PWM signal generation unit 2*e* generates a PWM signal based on the feedback voltage, adjusts switching of the switching element 12, and maintains the output voltage at a constant level.

Before the present embodiment is described in detail, a configuration of and a problem with a general primary-side-control flyback power supply will be described.

Figure 2:
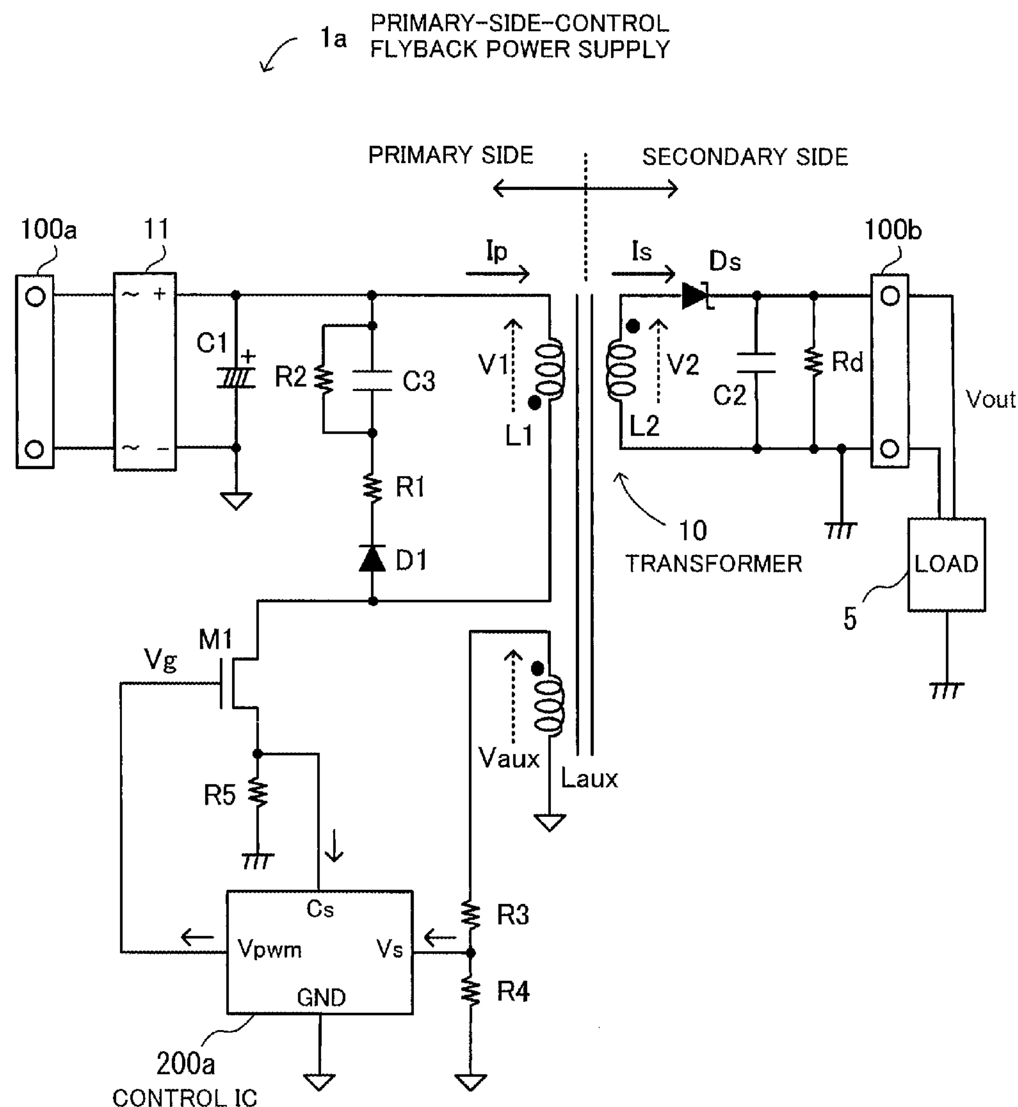
FIG. 2 illustrates an example of a configuration of a primary-side-control flyback power supply.

FIG. 2 illustrates an example of a configuration of a primary-side-control flyback power supply 1*a*. The primary-side-control flyback power supply 1*a* includes a bridge circuit 11, capacitors C1 to C3, resistors R1 to R5 and Rd, diodes D1 and Ds, a transformer 10, a switching element M1, and a control integrated circuit (IC) 200*a*. While the power supply of the control IC is not illustrated, the control IC is used by supplying a power supply from a high-potential-side output terminal of a bridge diode, an output terminal to which the rectified auxiliary winding voltage is applied, an external power supply device, or the like.

An NMOS transistor is used as the switching element M1 (alternatively, an insulated gate bipolar transistor (IGBT) or a bipolar transistor may be used).

The transformer 10 includes a primary winding L1, a secondary winding L2, and an auxiliary winding Laux.

Next, the connection of these elements in the circuit will be described. Two input terminals of the bridge circuit 11 are connected to AC voltage input terminals 100*a*. The positive output terminal of the bridge circuit 11 is connected to the positive terminal of the capacitor C1, one end of the resistor R2, one end of the capacitor C3, and one end of the primary winding L1 of the transformer 10.

The negative output terminal of the bridge circuit 11 is connected to the negative terminal of the capacitor C1 and ground (GND). The other end of the resistor R2 is connected to the other end of the capacitor C3 and one end of the resistor R1.

The other end of the resistor R1 is connected to the cathode of the diode D1, and the anode of the diode D1 is connected to the other end of the primary winding L1 and the drain of the switching element M1. The snubber circuit formed by the resistors R1 and R2, the capacitor C3, and the diode D1 is not limited to the above configuration.

One end of the auxiliary winding Laux of the transformer 10 is connected to one end of the resistor R3, and the other end of the auxiliary winding Laux is connected to GND. The control IC 200*a* has a terminal Vs connected to the other end of the resistor R3 and one end of the resistor R4, and the other end of the resistor R4 is connected to GND.

The control IC 200*a* has a terminal Cs connected the source of the switching element M1 and one end of the resistor R5, and the other end of the resistor R5 is connected to GND. The control IC 200*a* has a terminal Vpwm connected to the gate of the switching element M1 and has a GND terminal connected to GND.

One end of the secondary winding L2 of the transformer 10 is connected to the anode of the diode Ds, and the cathode of the diode Ds is connected to one end of the capacitor C2, one end of the resistor Rd, and one of DC voltage output terminals 100*b*.

The other end of the secondary winding L2 is connected to the other end of the capacitor C2, the other end of the resistor Rd, the other one of the DC voltage output terminals 100*b*, and GND. The two DC voltage output terminals 100*b* are connected to a load 5 connected to ground.

The bridge circuit 11 rectifies an AC voltage inputted from the AC voltage input terminals 100*a*. The capacitor C1 smoothes the rectified voltage to convert the AC voltage into a DC voltage. As a result, a voltage V1 is generated across the primary winding L1.

The diode Ds arranged on the secondary side rectifies a voltage V2 generated across the secondary winding L2. The capacitor C2 smoothes the rectified voltage, and the smoothed voltage is applied to the load 5. The resistor Rd is for discharging an electric current so that the output voltage is not excessively increased under a no-load condition. The resistor Rd is what is called a bleeder resistor.

The voltage V1 generated across the primary winding L1 and the voltage V2 generated across the secondary winding L2 have opposite polarities. However, a voltage Vaux generated across the auxiliary winding Laux and the voltage V2 generated across the secondary winding L2 have the same polarity.

Next, an operation will be described. The primary-side-control flyback power supply 1*a* includes the auxiliary winding Laux wound in the same direction as the secondary winding L2 and connected to GND on the primary side. The voltage (or a part of the voltage) across the auxiliary winding Laux is applied to the output voltage detection terminal Vs of the control IC 200*a*.

The control IC 200*a* includes a function of generating a reference voltage used as a setting value for the output voltage and detects a differential signal between the reference voltage and the voltage inputted to the output voltage detection terminal Vs through the auxiliary winding Laux.

Next, the control IC 200*a* generates a PWM signal by using the differential signal and current information inputted to the current detection terminal Cs and outputs the PWM signal from the terminal Vpwm.

The PWM signal is inputted to the gate of the switching element M1 as a gate signal. The switching element M1 is brought in an on- or off-state on the basis of the PWM signal. In accordance with this operation, PWM control for stabilizing the output voltage at a target value is performed.

Figure 3:
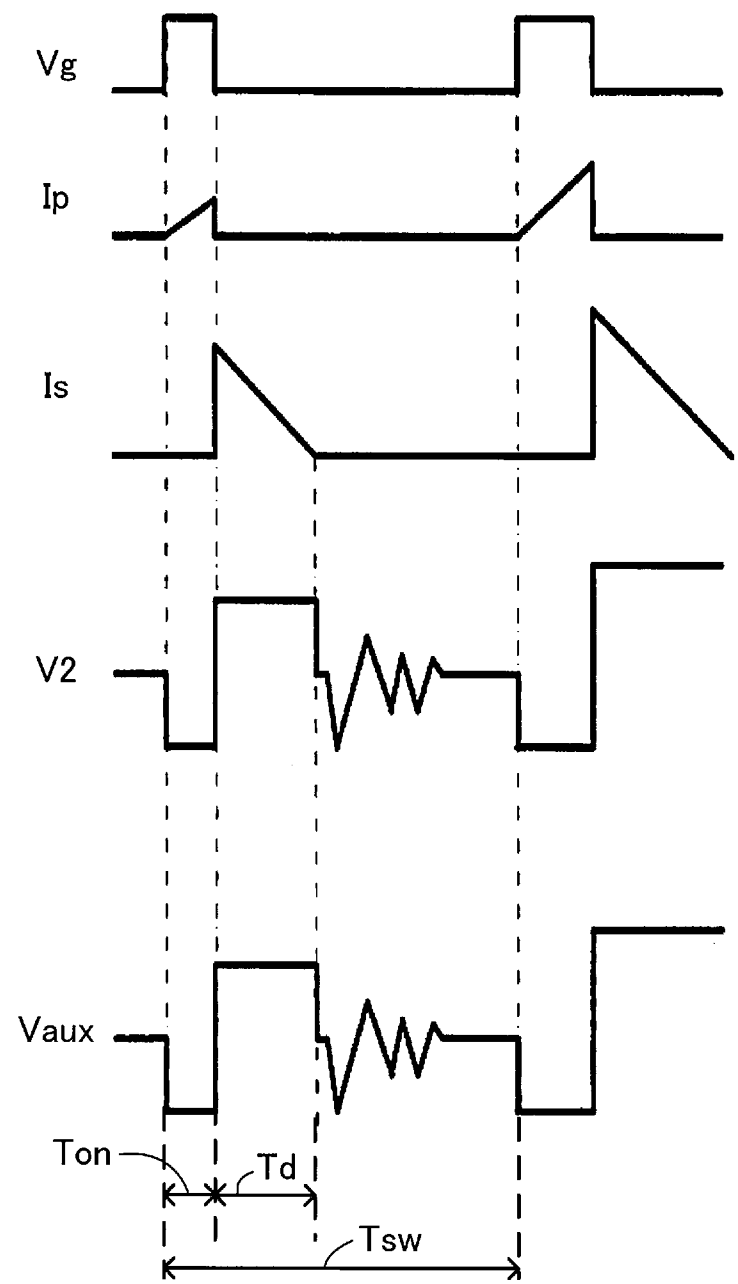
FIG. 3 illustrates waveforms of an ideal operation of the primary-side-control flyback power supply.

FIG. 3 illustrates waveforms of an ideal operation of the primary-side-control flyback power supply. In FIG. 3, "Tsw" represents a switching period of on and off of the switching element M1.

When the gate signal Vg of the switching element M1 reaches a high potential level (H level), the switching element M1 is brought in an on-state, and a primary current Ip as illustrated in FIG. 2 begins to flow.

Since the primary winding L1 includes an inductance component, the primary current Ip constantly increases with time as long as the switching element M1 remains in an on-state. In contrast, since the secondary winding L2 is wound in the direction opposite to the primary winding L1, a secondary current Is does not flow through the secondary winding L2 as long as the switching element M1 remains in an on-state.

After a period Ton elapses, when the gate signal Vg reaches a low potential level (L level), the switching element M1 is brought in an off-state. As a result, the primary current Ip stops flowing. Next, the energy accumulated in the transformer 10 is transmitted to the secondary side, and thus, the secondary side is brought in a conduction state. Namely, the secondary current Is begins to flow. The secondary current Is decreases with time.

Assuming that no voltage drop is caused by the secondary-side diode Ds in a secondary conduction period Td, the secondary voltage V2 generated across the secondary winding L2 is equal to the output voltage Vout. Namely, the secondary voltage V2 appears as a flat waveform as illustrated in FIG. 3 (on the condition that the output capacitor C2 has a sufficiently large capacitance).

Meanwhile, the voltage Vaux is generated across the auxiliary winding Laux. The voltage Vaux is proportional to the turn ratio between the auxiliary winding Laux and the secondary winding L2. The voltage Vaux(t) across the auxiliary winding Laux at time t may be calculated by the following expression (1).

$$Vaux(t)=(Naux/N2)\times V2(t) \quad (1)$$

In expression (1), N2 represents the number of turns of the secondary winding L2, Naux represents the number of turns of the auxiliary winding Laux, and V2(*t*) represents the voltage across the secondary winding L2.

In expression (1), the number N2 of turns of the secondary winding L2 and the number Naux of turns of the auxiliary winding Laux are set to be the same (N2=Naux), the voltage that corresponds to the output voltage Vout also appears across the auxiliary winding Laux in the secondary conduction period Td (Vaux=V2).

Thus, by detecting the auxiliary winding voltage Vaux in the secondary conduction period Td, the control IC 200*a* is able to obtain information about the output voltage generated across the secondary side and perform PWM control based on the obtained output voltage information.

Next, a problem with the primary-side-control flyback power supply 1*a* will be described. In reality, a voltage drop is caused on the secondary side because of the circuit configuration on the secondary side. Thus, regarding the relationship between the secondary voltage V2 and the output voltage, parameters relating to this voltage drop need to be considered.

If the parameters relating to the voltage drop on the secondary side are taken into consideration, the relationship between the secondary voltage V2 and the output voltage Vout is represented by expression (2).

$$V2(t)=Vout(t)+VF0+r\times Is(t) \quad (2)$$

In expression (2), VF0 represents a voltage drop at the diode Ds when Is=0 A. In addition, Is(t) represents a secondary current that flows in the direction as illustrated in FIG. 2, and r represents an equivalent resistance component including the resistance of the diode Ds and the output voltage path on the secondary side.

Assuming that a target output value $Vout_{set}$ set for the output voltage is used in place of the secondary voltage V2(*t*), expression (2) may be written as expression (3).

$$Vout(t)=Vout_{set}-VF0-r\times Is(t) \quad (3)$$

In expression (3), the sum of VF0 in the second term and r×Is(t) in the third term represents the error voltage (the voltage drop on the secondary side). It is seen that the output voltage Vout is obtained by subtracting this error voltage from the target output value $Vout_{set}$.

Thus, for the control IC 200*a* to accurately recognize the output voltage Vout, it is important that the auxiliary winding voltage Vaux inputted to the output voltage detection terminal Vs be corrected in view of the error caused by VF0 in the second term and r×Is(t) in the third term.

Since the error caused by VF0 in the second term is the voltage drop at the diode Ds when Is=0 A, the error may be handled as a fixed value. However, as to the error caused by r×Is(t) in the third term, Is(t) changes, for example, depending on the load current when the primary-side-control flyback power supply 1*a* is in operation. Thus, the third term represents a variable voltage drop, and dynamic correction is needed therefor.

To eliminate the error voltage represented by the third term, measures have conventionally been proposed. For example, the primary-side-control flyback power supply may control the output voltage by using the auxiliary winding voltage Vaux applied when the secondary current Is reaches zero (for example, the above Japanese National Publication of International Patent Application No. 2010-521954).

According to this method, the primary-side-control flyback power supply 1*a* determines that the secondary current Is has reached zero by detecting timing immediately before the auxiliary winding voltage Vaux sharply decreases. In addition, the primary-side-control flyback power supply 1*a* controls the output voltage by using the auxiliary winding voltage Vaux applied when the secondary current Is reaches zero.

Figure 4:
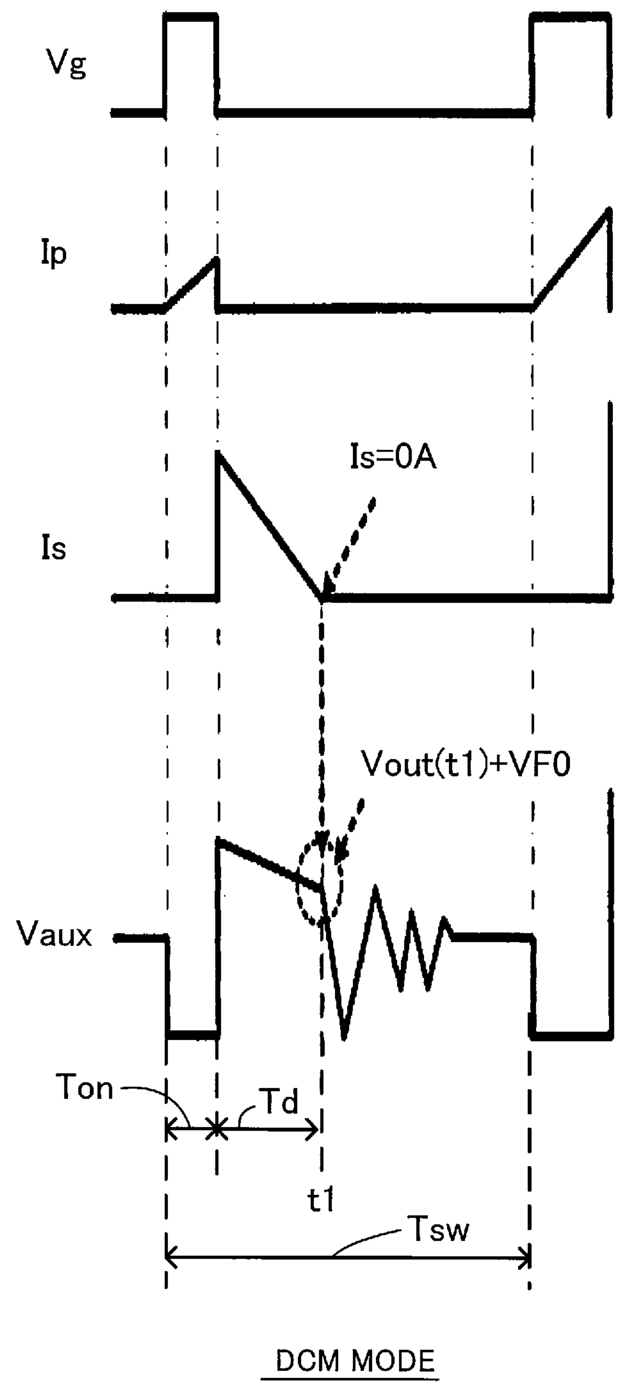
FIG. 4 illustrates waveforms of an actual operation of the primary-side-control flyback power supply.

FIG. 4 illustrates waveforms of an actual operation of the primary-side-control flyback power supply 1*a*. More specifically, FIG. 4 illustrates operation waveforms in the DCM in which the secondary current Is reaches zero in the switching period Tsw.

The control IC 200*a* detects the auxiliary winding voltage Vaux applied immediately before the secondary current Is reaches 0 A, namely, immediately before the secondary conduction period Td ends, and receives the detected auxiliary winding voltage Vaux via the output voltage detection terminal Vs.

Since Is=OA at timing t1, the auxiliary winding voltage Vaux is represented by Vout(t1)+VF0 (see the above expression (2)). Thus, the error to be corrected is only the voltage drop VF0. As described above, the voltage drop VF0 is a fixed value and can easily be corrected.

In this way, the primary-side-control flyback power supply 1*a* is able to eliminate the error caused by the voltage drop on the secondary side by using the auxiliary winding voltage Vaux applied when the secondary current Is reaches zero. However, while this method is effective in the DCM, the voltage drop on the secondary side cannot completely be eliminated when the primary-side-control flyback power supply is operated in the CCM.

Figure 5:
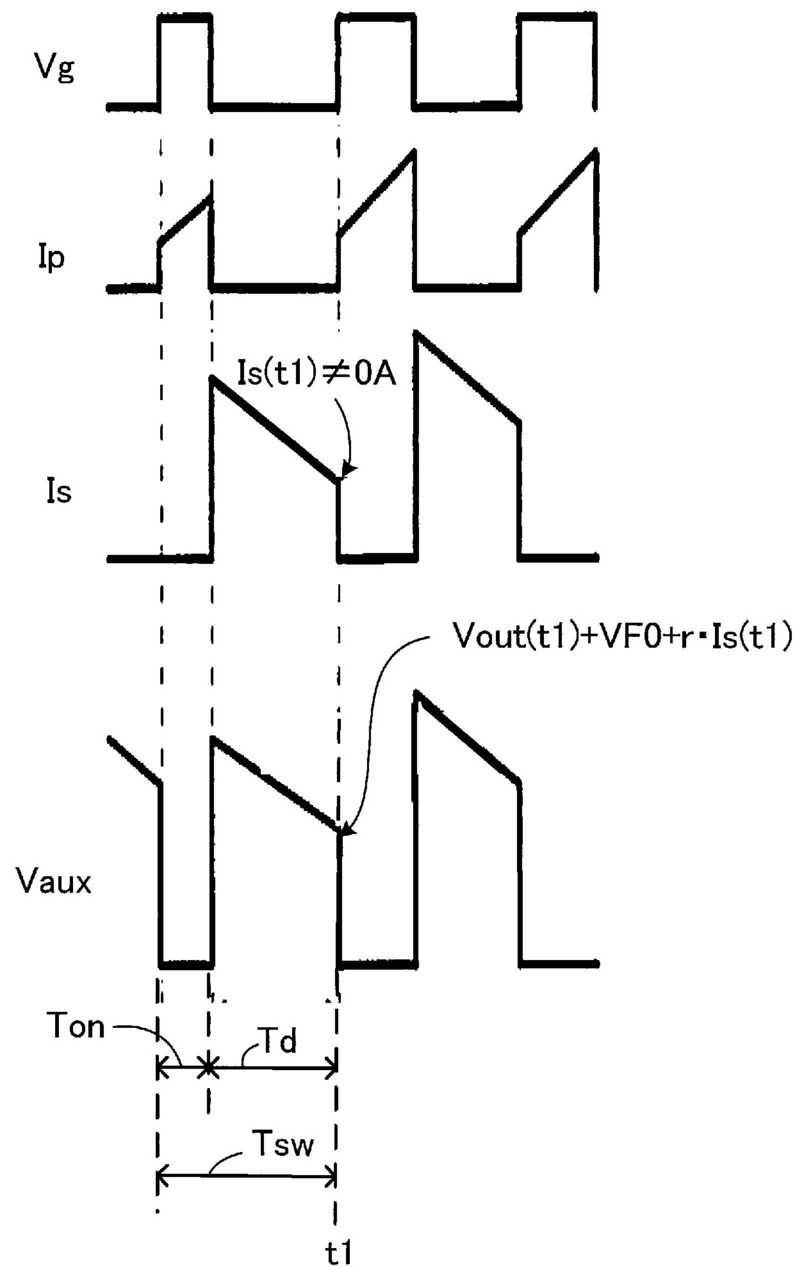
FIG. 5 illustrates waveforms of another actual operation of the primary-side-control flyback power supply.

FIG. 5 illustrates waveforms of another actual operation of the primary-side-control flyback power supply. More specifically, FIG. 5 illustrates operation waveforms in the CCM in which the secondary current Is does not reach zero in the switching period Tsw.

In the CCM, while the secondary current Is is flowing (before the secondary current Is reaches zero), the primary side turns on and the primary current Ip flows.

In the secondary conduction period Td, more specifically, at timing t1 at which the secondary period Td ends, the control IC 200*a* detects the auxiliary winding voltage Vaux inputted to the output voltage detection terminal Vs.

In the CCM, the secondary current Is has not reached 0 A at timing t1. Since Is is not 0 A, Vaux(t1) is represented by Vout(t1)+VF0+r×Is (t1) as represented by expression (2). Namely, the error voltage in the third term is included.

While there is a switching power supply that operates only in the DCM throughout its operation range, there is also a switching power supply that operates in the CCM when the load current is large.

Thus, in the case of the latter switching power supply, even if the switching power supply controls the output voltage by detecting the timing at which the auxiliary winding voltage Vaux has reached the lowest level in the secondary conduction period Td, since the secondary current Is does not reach zero in the CCM, the error caused by the voltage drop on the secondary side cannot be eliminated.

The present technique has been made in view of such circumstances and provides a device and a method for controlling a switching power supply. The device and the method achieve an accurate output voltage, whether the switching power supply is operated in the DCM or CCM.

Figure 6:
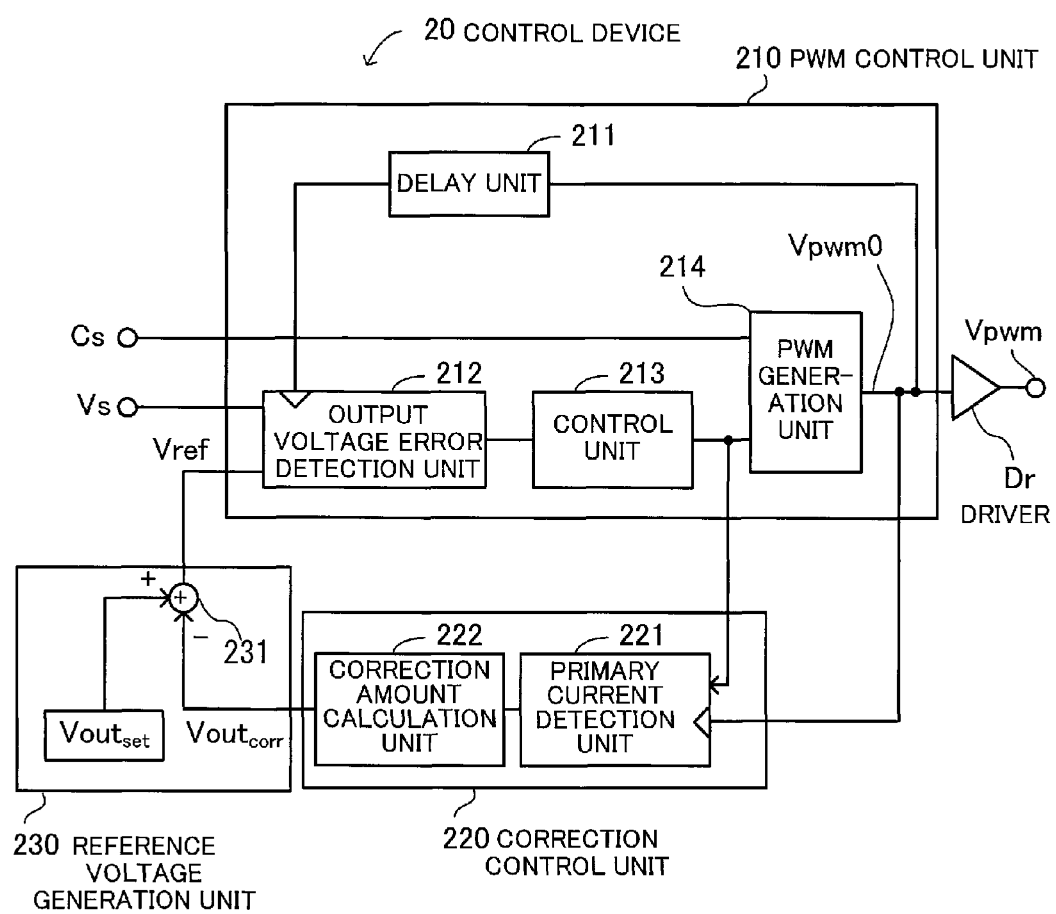
FIG. 6 illustrates an example of a configuration of a control device of a switching power supply.

Next, a configuration and an operating principle of a control device, to which the present technique is directed, of a switching power supply will be described. FIG. 6 illustrates an example of a configuration of a control device 20 of a switching power supply. The control device 20 of the switching power supply includes a PWM control unit 210, a correction control unit 220, a reference voltage generation unit 230, and a driver Dr.

The PWM control unit 210 includes a delay unit 211, an output voltage error detection unit 212, a control unit 213, and a PWM generation unit 214. The correction control unit 220 includes a primary current detection unit 221 and a correction amount calculation unit 222. The reference voltage generation unit 230 includes an operator 231.

The PWM control unit 210 realizes the functions of the output voltage error detection unit 2*a*, the control unit 2*d*, and the PWM signal generation unit 2*e* illustrated in FIG. 1. The correction control unit 220 realizes the functions of the correction amount calculation unit 2*b* illustrated in FIG. 1.

The reference voltage generation unit 230 realizes the functions of the reference voltage generation unit 2*c* illustrated in FIG. 1.

The control device 20 controls the output voltage by using the auxiliary winding voltage Vaux detected a certain period Tsh after a secondary conduction period starts.

When a secondary conduction period starts (when a primary conduction period ends) corresponds to when a PWM signal Vpwm0 outputted from the PWM generation unit 214 reaches an L level.

Thus, the delay unit 211 delays the PWM signal Vpwm0 outputted from the PWM generation unit 214 by the certain period Tsh and outputs the delayed PWM signal Vpwm0, and the output voltage error detection unit 212 latches the auxiliary winding voltage Vaux inputted via the output voltage detection terminal Vs with the output signal from the delay unit 211. In this way, the control device 20 detects the auxiliary winding voltage Vaux the certain period Tsh after the secondary conduction period starts.

To obtain suitable output voltage accuracy, the control device 20 corrects the secondary voltage drop (r×Is(Tsh)) corresponding to the secondary current Is. Hereinafter, the correction control on the secondary voltage drop will be described in detail.

First, the primary current detection unit 221 recognizes a primary current $Ip_{pk}$ (the peak value of the primary current) that flows when the PWM signal Vpwm0 reaches the L level. From the primary current $Ip_{pk}$, the secondary current $Is_{pk}$ (the peak value of the secondary current) that flows when the secondary conduction period starts is calculated by the following expression (4).

$$Is_{pk}=(N1/N2)\times Ip_{pk} \quad (4)$$

The inductance Ls of the secondary winding L2 of the transformer 10 is calculated by the following expression (5) including the inductance Lp of the primary winding L1 of the transformer 10 and the turn ratio (N2/N1).

$$Ls=(N2/N1)^2\times Lp \quad (5)$$

In addition, the secondary current Is(Tsh) the period Tsh after the secondary conduction period starts is calculated by the following expression (6).

$$Is(Tsh)=Is_{pk}-(Vout/Ls)\times Tsh \quad (6)$$

By substituting expressions (4) to (6) in expression (3), the output voltage Vout(Tsh) at Tsh may be expressed as expression (7).

$$Vout(Tsh) = Vout_{set} - \left\{\left(VF0 - r\times\frac{Vout}{Ls}\times Tsh\right) + r\times\frac{N1}{N2}\times Ip_{pk}\right\} \quad (7)$$

The second term in expression (7) corresponds to the total voltage drop on the secondary side. If the second term is expressed as $Vout_{corr}$, expression (8) is obtained.

$$Vout_{corr} = \left(VF0 - r\times\frac{Vout}{Ls}\times Tsh\right) + r\times\frac{N1}{N2}\times Ip_{pk} \quad (8)$$

By adding the voltage drop correction amount $Vout_{corr}$ in expression (8) to the target output voltage value $Vout_{set}$ in expression (7), the output voltage value is allowed to be corrected to the target output value.

In expression (8), only the primary current $Ip_{pk}$ is a parameter that changes while the device is in operation. Thus, the primary current detection unit 221 detects the primary current $Ip_{pk}$, and the correction amount calculation unit 222 performs the calculation corresponding to expression (8) and determines a correction amount.

In addition, the reference voltage generation unit 230 includes the operator 231, which adds the correction amount $Vout_{corr}$ determined by the correction amount calculation unit 222, to the target output value $Vout_{set}$ and outputs the addition result as a reference voltage Vref. The target output value $Vout_{set}$ may previously be set as a unique value in the device or as a value set from the outside.

The output voltage error detection unit 212 compares the reference voltage Vref with the output voltage value at time Tsh (the value of the detected auxiliary winding voltage) and outputs the error voltage. Configured as described above, the switching power supply is able to obtain an accurate output voltage without being affected by the voltage drop on the secondary side, whether the switching power supply is operated in the DCM or CCM.

Next, a specific circuit configuration and operation of the control device 20 of a switching power supply will be described. First, an overall configuration of a flyback switching power supply 1-1 including the control device 20 will be described.

Figure 7:
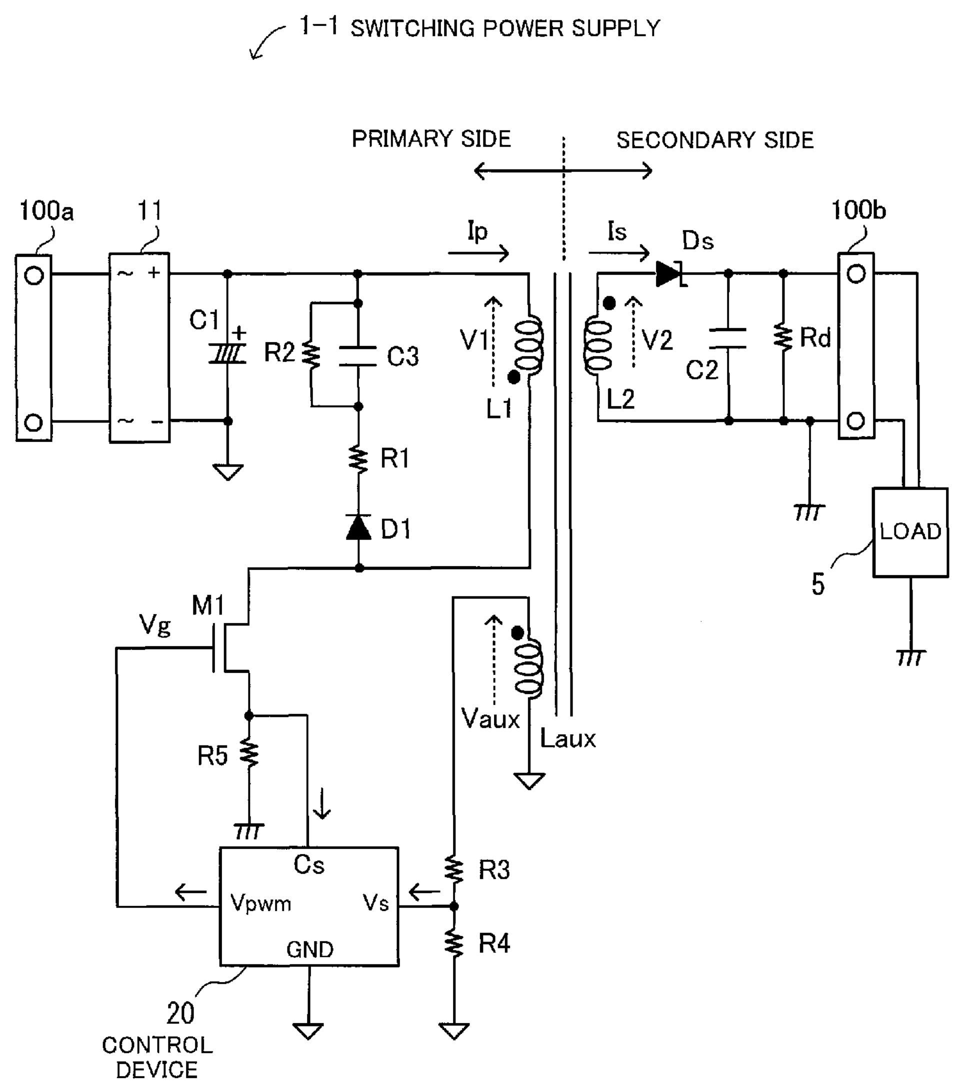
FIG. 7 illustrates an example of a configuration of a flyback switching power supply.

FIG. 7 illustrates an example of a configuration of the flyback switching power supply 1-1. The flyback switching power supply 1-1 includes a bridge circuit 11, capacitors C1 to C3, resistors R1 to R5 and Rd, diodes D1 and Ds, a transformer 10, a switching element M1, and a control device 20. The flyback switching power supply 1-1 has the same configuration as that of the primary-side-control flyback power supply 1*a*, except that the control IC 200*a* illustrated in FIG. 2 has been replaced by the control device 20.

The control device 20 is arranged on the primary side of the flyback power supply. The control device 20 includes an output voltage detection terminal Vs for detecting a voltage obtained by dividing an auxiliary winding voltage Vaux, a current detection terminal Cs for detecting a primary current, and a gate output terminal Vpwm for outputting a PWM signal as a gate signal. Since the constituent elements other than the control device 20 have already been described with reference to FIG. 2, redundant description thereof will be omitted.

Figure 8:
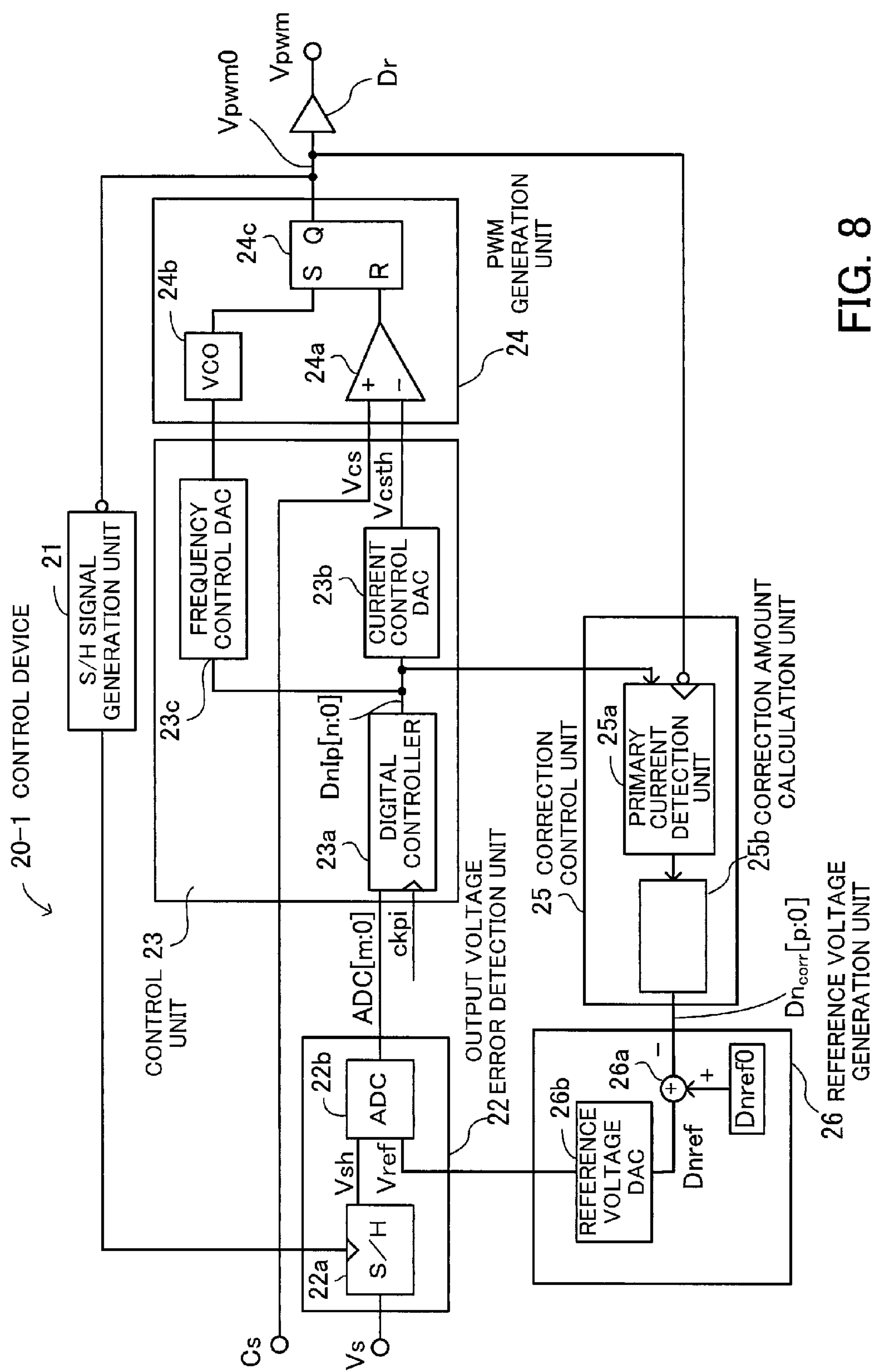
FIG. 8 illustrates an example of a configuration of a control device of the switching power supply.

FIG. 8 illustrates an example of a configuration of a control device 20-1 of the switching power supply. The control device 20-1 includes a sample and hold (S/H) signal generation unit 21, an output voltage error detection unit 22, a control unit 23, a PWM generation unit 24, a correction control unit 25, a reference voltage generation unit 26, and a driver Dr.

The output voltage error detection unit 22 includes a S/H circuit 22*a* and an analog-to-digital converter (ADC) 22*b*. The control unit 23 includes a digital controller 23*a*, a current control digital-to-analog converter (DAC) 23*b*, and a frequency control DAC 23*c*.

The PWM generation unit 24 includes a comparator 24*a*, a voltage controlled oscillator (VCO) 24*b*, and an RS flip flop 24*c*. The correction control unit 25 includes a primary current detection unit 25*a* and a correction amount calculation unit 25*b*. The reference voltage generation unit 26 includes an operator 26*a* and a reference voltage DAC 26*b*.

The S/H signal generation unit 21 corresponds to the delay unit 211 in FIG. 6, and the output voltage error detection unit 22 corresponds to the output voltage error detection unit 212 in FIG. 6.

The control unit 23 corresponds to the control unit 213 in FIG. 6, and the PWM generation unit 24 corresponds to the PWM generation unit 214 in FIG. 6. The correction control unit 25 corresponds to the correction control unit 220 in FIG. 6 and the reference voltage generation unit 26 corresponds to the reference voltage generation unit 230 in FIG. 6.

In FIG. 8, the S/H circuit 22*a* detects a voltage inputted via the output voltage detection terminal Vs per switching period of the switching element M1. The S/H circuit 22*a* performs sampling time Tsh after the PWM signal Vpwm0 changes from the H level to the L level (when the secondary conduction period starts). The S/H circuit 22*a* holds the sampling value until the digital controller 23*a* located downstream thereof completes its calculation.

The ADC 22*b* outputs a digital signal based on an output signal Vsh from the S/H circuit 22*a*. For example, the ADC 22*b* is a window ADC and outputs the error between the output signal Vsh from the S/H circuit 22*a* and a reference voltage Vref as a digital value. The reference voltage Vref is a target voltage outputted from the S/H circuit 22*a* and is outputted from the reference voltage DAC 26*b*, which will be described in detail below.

The digital controller 23*a* receives the output signal ADC[m:0] from the ADC 22*b* and a clock ckpi. The expression "[m:0]" represents that the least significant bit and most significant bit (LSB and MSB) are 0 and m bits, respectively. Namely, the output signal ADC[m:0] is a (m+1)-bit signal from the 0th to m-th bits in total.

The digital controller 23*a* performs a control operation for setting the signal ADC[m:0] outputted from the ADC 22*b* to zero. More specifically, the digital controller 23*a* performs a control operation for setting the error between the output signal Vsh from the S/H circuit 22*a* and the reference voltage Vref to be 1 LSB or less, for example. An expression based on proportional integral (PI) control, an expression based on proportional integral derivative (PID) control, or the like may be used as an expression for the control operation.

An output signal DnIp[n:0] from the digital controller 23*a* is inputted to the current control DAC 23*b*, the frequency control DAC 23*c*, and the primary current detection unit 25*a*. The current control DAC 23*b* converts the digital signal DnIp[n:0] into an analog signal Vcsth.

The comparator 24*a* compares the signal Vcsth outputted from the current control DAC 23*b* with a voltage Vcs inputted via the current detection terminal Cs.

The input voltage Vcs is inputted to the positive input terminal of the comparator 24*a*, and the signal Vcsth is inputted to the negative input terminal of the comparator 24*a*. Thus, when the level of the input voltage Vcs is lower than that of the signal Vcsth, the comparator 24*a* outputs an L level. In contrast, when the level of the input voltage Vcs is equal to or more than the signal Vcsth, the comparator 24*a* outputs an H level.

The output from the comparator 24*a* is inputted to the reset terminal (R) of the RS flip flop 24*c* that is arranged downstream of the comparator 24*a* and that generates a PWM signal. The output from the comparator 24*a* determines the period for which the PWM signal is outputted at the H level.

The frequency control DAC 23*c* converts the output signal DnIp[n:0] from the digital controller 23*a* into an analog signal and outputs a voltage signal for controlling the oscillation frequency of the VCO 24*b*. The VCO 24*b* generates a pulse signal having a switching frequency based on the voltage signal outputted from the frequency control DAC 23*c* and outputs the pulse signal to the set terminal (S) of the RS flip flop 24*c*.

The switching frequency may be changed depending on the load condition. In the case of the configuration illustrated in FIG. 8, the frequency control DAC 23*c* and the VCO 24*b* change the switching frequency, depending on the internal control amount (the output value of the digital controller 23*a*).

Next, the correction control unit 25 and the reference voltage generation unit 26 will be described. The primary current detection unit 25*a* acquires the value of the output signal DnIp[n:0] from the digital controller 23*a* when the PWM signal changes from the H level to the L level (when the primary switching element M1 is brought in an off-state).

The output signal DnIp[n:0] from the digital controller 23*a* at this timing corresponds to the primary current value $Ip_{pk}$ flowing when the primary switching element M1 is brought in an off-state, as can be seen by the configuration in which the digital controller 23*a* is connected to the comparator 24*a* via the current control DAC 23*b*.

In addition, as described above, the S/H circuit 22*a* detects the signal inputted via the output voltage detection terminal Vs. Since the detection is fixedly performed the time Tsh after the falling edge of a PWM signal, the detection timing is known. Thus, as indicated by expressions (4) to (8), by obtaining the information about the primary current value $Ip_{pk}$, the correction amount calculation unit 25*b* is able to calculate a digital value corresponding to the correction amount $Vout_{corr}$ per switching period.

The digital-value correction amount $Dn_{corr}$ that is outputted from the correction amount calculation unit 25*b* and that corresponds to the correction amount $Vout_{corr}$ is represented by the following digital operation expression (9).

$$Dn_{corr} = Rdiv \times \frac{Naux}{N2} \times \left\{ \left( VF0 - r \times \frac{Vout}{Ls} \times Tsh \right) + r \times \frac{N1}{N2} \times Kdac1 \times DnIp \right\} \tag{9}$$

In expression (9), "Rdiv" represents the resistance ratio of the dividing resistors connected to both ends of the auxiliary winding, and "N1," "N2," and "Naux" represent the numbers of turns of the primary, secondary, and auxiliary windings, respectively. "Ls" represents the inductance value of the secondary winding, "VF0" represents the voltage drop of the secondary diode Ds when no current is flowing. In addition, "r" represents the resistance component of the diode Ds and the secondary output voltage path, and "Vout" represents the output voltage value. "Tsh" represents a digital value that corresponds to the set delay time between when the secondary conduction period starts and when the S/H circuit 22*a* begins sampling. "Kdac1" represents the conversion gain of the current control DAC 23*b*, and "DnIp" represents the output value of the digital controller 23*a*.

The operator 26*a* adds a digital reference value Dnref0 that corresponds to the target voltage value $Vout_{set}$ and the correction amount $Dn_{corr}$ [p:0] and outputs the operation result Dnref. The reference voltage DAC 26*b* converts the operation result Dnref outputted from the operator 26*a* from the digital value to an analog signal, generates a reference voltage Vref as a target value for the voltage inputted via the output voltage detection terminal Vs, and transmits the reference voltage Vref to the ADC 22*b*.

As described above, the control device 20-1 of the switching power supply calculates a correction amount that corresponds to the secondary voltage drop per switching period and changes the reference voltage that determines a target value for the output voltage value.

In this way, even when the load is changed and the secondary voltage drop is changed, the error voltage caused by the secondary voltage drop is accurately corrected, whether the switching power supply is operated in the DCM or CCM. Namely, suitable load regulation characteristics (the percentage change in output voltage when the load current changes) are obtained.

Next, a slope compensation function will be described. In a current mode in which the peak current is controlled by feeding back the inductor current of the transformer 10 and performing constant voltage control as illustrated in FIG. 8, when the duty ratio ((the H level period of a pulse/period)× 100%) is 50% or more, subharmonic oscillation could occur. Thus, it is preferable that a slope compensation function be included.

Thus, the control device 20-1 illustrated in FIG. 8 may include a slope compensation function. For example, the control device 20-1 may perform slope compensation by superimposing a ramp voltage and a voltage inputted via the current detection terminal Cs and inputting a result of the superimposition to the positive input terminal of the comparator 24*a*.

However, the control device 20-1 illustrated in FIG. 8 estimates the secondary current while determining the digital control amount DnIp obtained when the primary switching element M1 is brought in an off-state to correspond to the primary current $Ip_{pk}$ and corrects the secondary voltage drop.

Thus, if the control device 20-1 includes only the above slope compensation function, a ramp voltage is superimposed on the detected primary current. Namely, if the correction expression of expression (9) including the digital control amount DnIp is used, the correction amount is excessively increased by the ramp voltage, and as a result, the calculated error excessively increases the output voltage.

Thus, to suppress this error, for example, a digital signal that corresponds to the ramp voltage is added to the output from the digital controller 23*a*, and the digital output DnIpslope to which the ramp signal has been added may be inputted to each of the primary current detection unit 25*a* and the current control DAC 23*b*. In this way, the error caused by the above ramp voltage is avoided.

Figure 9:
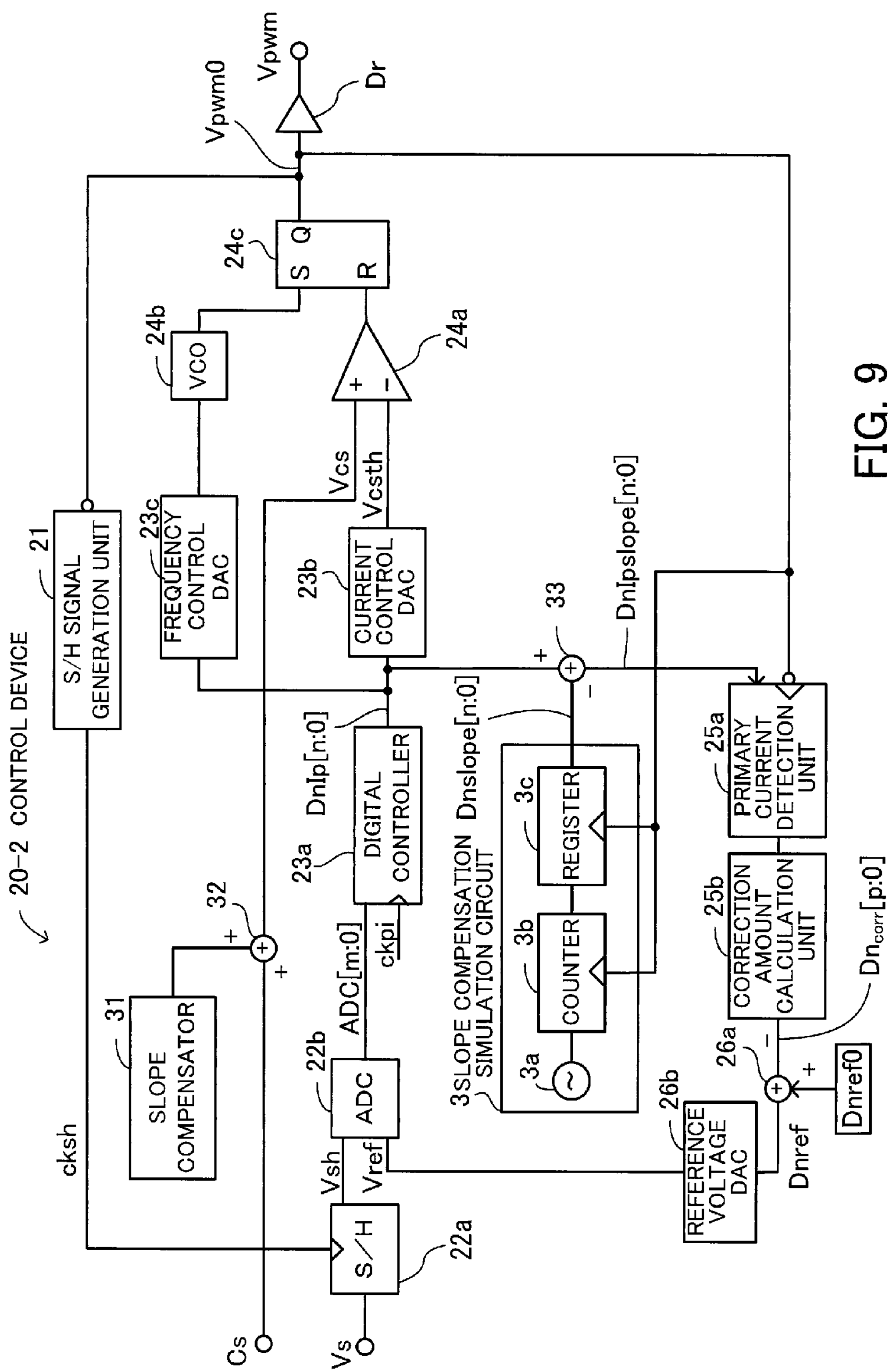
FIG. 9 illustrates an example of a configuration of a control device of the switching power supply.

Next, a control device that performs slope compensation and that is included in a switching power supply will be described. FIG. 9 illustrates an example of a configuration of a control device 20-2 of the switching power supply, and FIG. 10 is a timing diagram illustrating operation waveforms.

In addition to the circuit elements illustrated in FIG. 8, the control device 20-2 includes, as additional circuit elements, a slope compensator 31, operators 32 and 33, and a slope compensation simulation circuit 3. The other elements are the same as those illustrated in FIG. 8.

Figure 10:
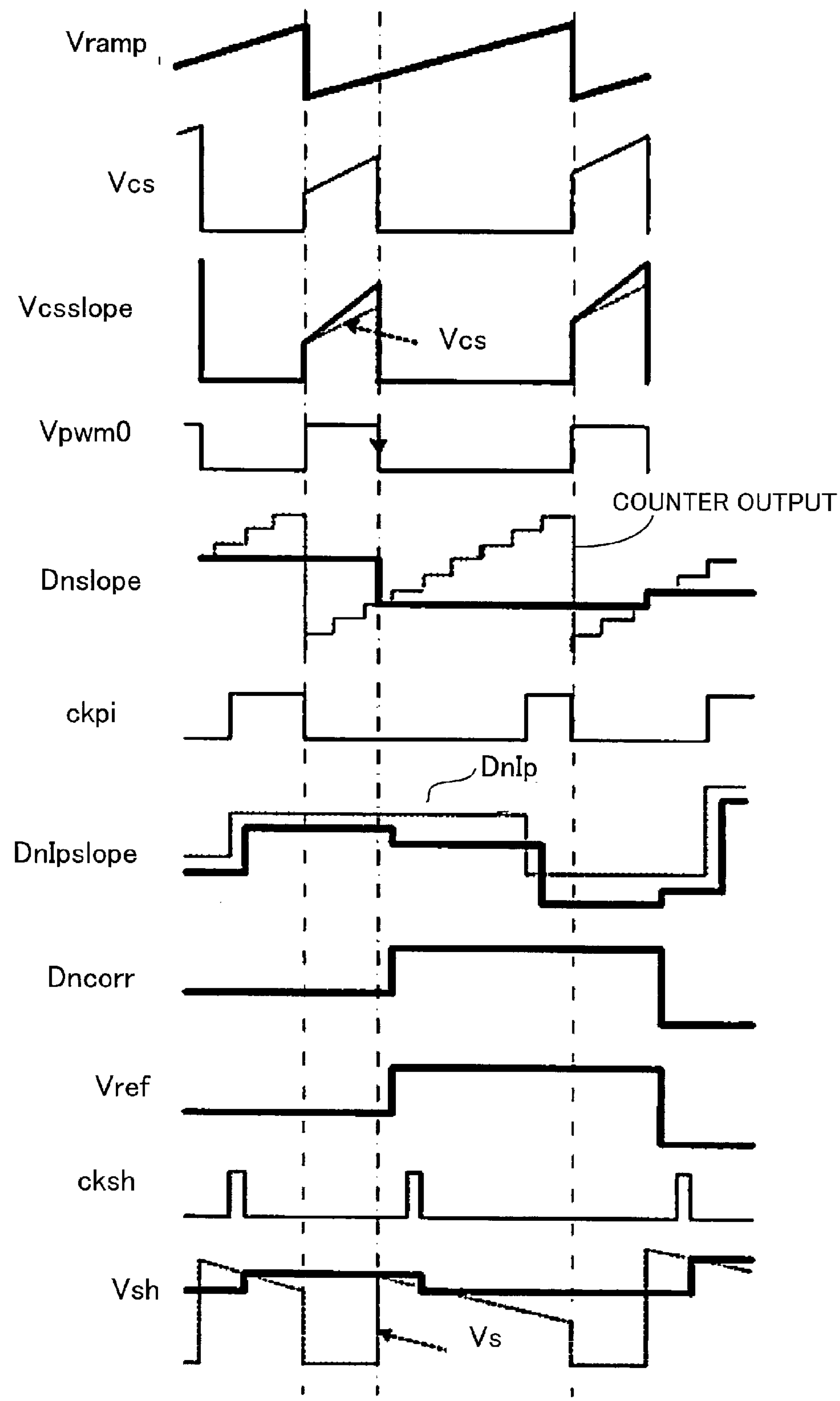
FIG. 10 is a timing diagram illustrating operation waveforms.

Among the operation waveforms illustrated in FIG. 10, "Vramp" represents the output from the slope compensator 31. "Vcs" represents the voltage inputted via the current detection terminal Cs. "Vcsslope" represents the sum of the value Vramp and the value Vcs.

"Vpwm0" represents the signal inputted to the driver Dr. "Dnslope" represents the signal outputted from the slope compensation simulation circuit 3. In addition, "ckpi" represents the clock signal inputted to the digital controller 23*a*.

"DnIpslope" represents a value obtained by subtracting the value Dnslope from the value DnIp outputted from the digital controller 23*a*. "Dncorr" represents the signal outputted from the correction amount calculation unit 25*b*. "Vref" represents the signal outputted from the reference voltage DAC 26*b*. In addition, "cksh" represents a clock signal inputted to the S/H circuit 22*a*, and "Vsh" is a signal outputted from the S/H circuit 22*a*.

In FIG. 9, the slope compensator 31 generates a ramp voltage. The operator 32 superimposes the ramp voltage and the voltage inputted via the current detection terminal Cs. The superimposition result outputted from the operator 32 is inputted to the positive input terminal of the comparator 24*a*.

The slope compensation simulation circuit 3 includes an oscillator 3*a*, a counter 3*b*, and a resistor 3*c*. At a rising edge of the PWM signal Vpwm0 (when the primary switching element M1 is brought in an on-state), the counter 3*b* is reset and begins counting by using the output signal from the oscillator 3*a* as a clock.

At a falling edge of the PWM signal Vpwm0 (when the primary switching element M1 is brought in an off-state), the counter 3*b* stops counting. The resistor 3*c* resets holding the counter output value at a falling edge of the PWM signal Vpwm0 and holds the counter output value at a rising edge of the PWM signal Vpwm0.

The operation clock period Tcnt of the counter 3*b* is set (1/Tcnt) to correspond to the voltage change of the ramp voltage of the slope compensator 31 over time (ΔV/Δ t).

As another means for setting a counter range so that the product of the clock period $T_{cnt}$ of the counter 3*b* and the maximum count number $N_{cnt}$ is larger than the maximum switching period $Ts_{max}$, a gain may be set to the counter output and the gain may be outputted.

At a falling edge of the PWM signal, the operator 33 performs calculation processing on the output Dnslope[n:0] from the slope compensation simulation circuit 3 and the output DnIp[n:0] from the digital controller 23*a*, generates a digital value Dnlpslope[n:0] that corresponds to the primary current value Ip on which slope compensation has been performed, and inputs the digital value Dnlpslope[n:0] to the primary current detection unit 25*a*.

The subsequent operation is the same as that of the control device 20-1 illustrated in FIG. 8. Namely, the correction amount calculation unit 25*b* calculates a correction amount, and the operator 26*a* adds the digital reference value Dnref0 and the voltage value that corresponds to the correction amount. The reference voltage DAC 26*b* generates the reference voltage Vref corrected per switching period from the addition result, and the ADC 22*b* compares the reference voltage Vref with the output Vsh from the S/H circuit 22*a*. In this way, desired PWM control is performed.

Configured in this way, the control device 20-2 is able to perform slope compensation without causing the current control DAC 23*b* to have faster response characteristics than those of a ramp signal generation clock.

In addition, even under operating conditions where a slope compensation operation is needed, the secondary voltage drop is accurately corrected, and suitable load regulation characteristics are obtained.

Next, a control device of a switching power supply that is able to control the start and stop of the slope compensation will be described. The switching power supply does not always need to execute the slope compensation while in operation. The switching power supply does not need to execute the slope compensation under certain input and output conditions.

For example, when the load current and the duty ratio are small, since no subharmonic oscillation occurs, no slope compensation is needed. Thus, the control device 20-2 illustrated in FIG. 9 may be provided with a function of controlling the start and stop of the slope compensation.

Figure 11:
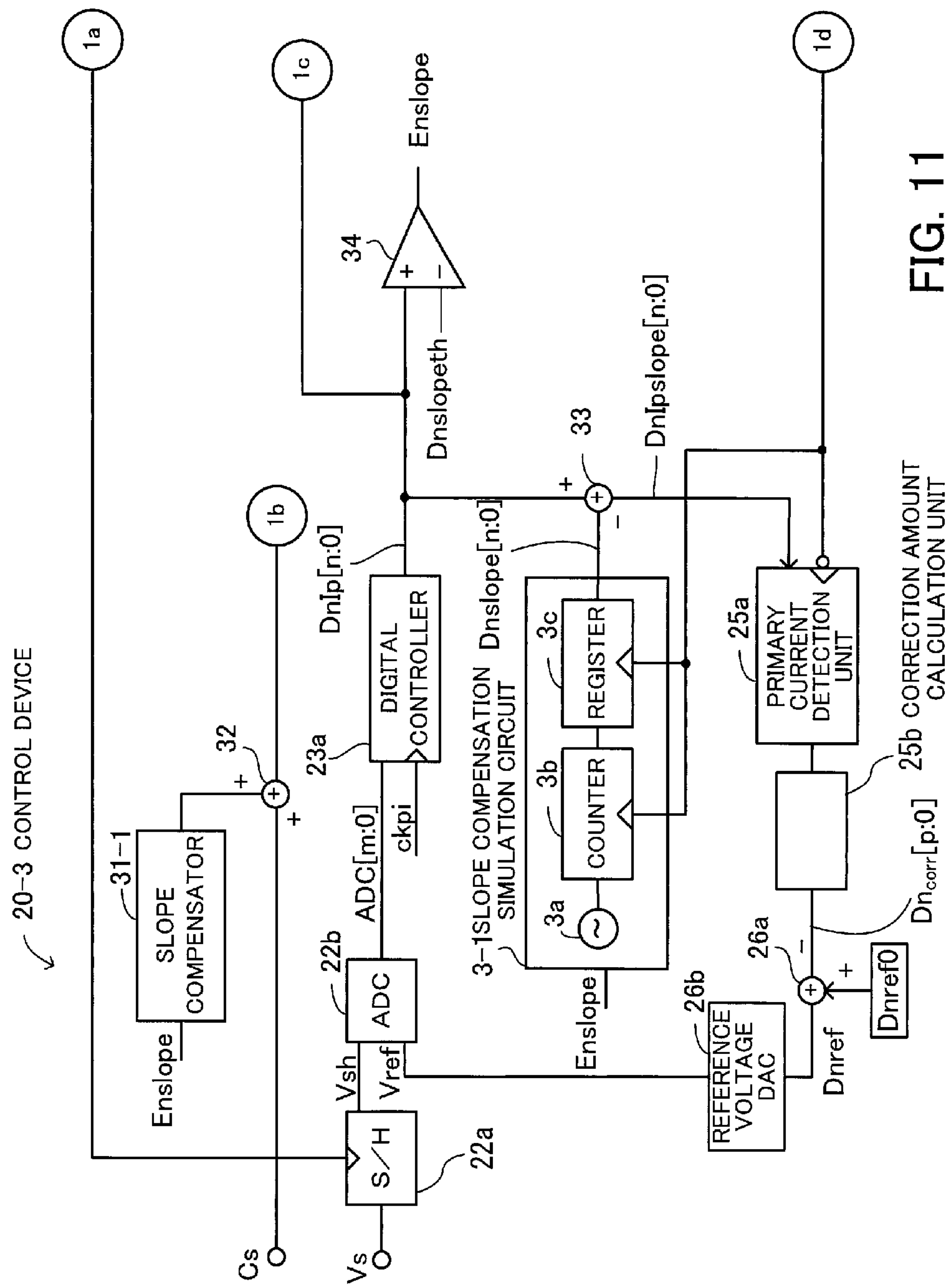
FIGS. 11 and 12 illustrate an example of a configuration of a control device of the switching power supply.
Figure 12:
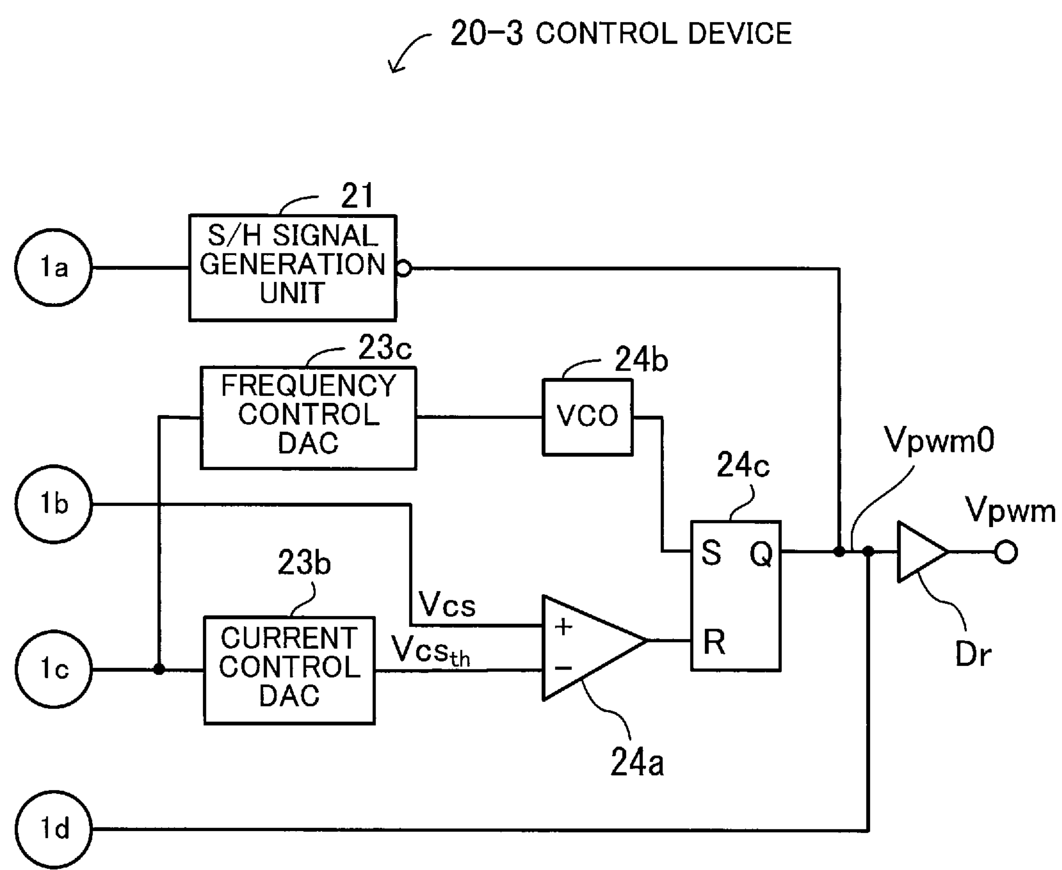

FIGS. 11 and 12 illustrate an example of a configuration of a control device 20-3 of the switching power supply. The control device 20-3 of the switching power supply determines the start and stop of the slope compensation circuit on the basis of the output signal DnIp from the digital controller 23*a*.

In addition to the elements in the circuit configuration illustrated in FIG. 9, the control device 20-3 includes a slope compensation comparator 34 as an additional circuit element. In addition, each of a slope compensator 31-1 and a slope compensation simulation circuit 3-1 additionally include an input terminal for receiving an output signal Enslope from the slope compensation comparator 34. The other basic configuration is the same as that illustrated in FIG. 9.

The output signal DnIP from the digital controller 23*a* is inputted to the positive input terminal of the slope compensation comparator 34, and a determination value Dnslopeth for determining whether to start or stop the slope compensation is inputted to the negative input terminal of the slope compensation comparator 34. The determination value Dnslopeth may be set in advance as a unique value in the device or as a value set from the outside.

When the value of the signal DnIp is equal to or more than the determination value Dnslopeth, the slope compensation comparator 34 outputs an H-level pulse signal Enslope (the start of the slope compensation).

In contrast, when the value of the signal DnIp is less than the determination value Dnslopeth, the slope compensation comparator 34 outputs an L-level pulse signal Enslope (the stop of the slope compensation).

Each of the slope compensator 31-1 and the slope compensation simulation circuit 3-1 includes an input terminal for receiving the pulse signal Enslope and stops its output on the basis of the pulse signal Enslope. Configured in this way, the control device 20-3 is able to flexibly control the start and stop of the slope compensation on the basis of input and output conditions.

Next, overcurrent protection will be described. Many switching power supplies include an overcurrent protection circuit for preventing damage to load or switching elements when an erroneous operation occurs.

The following description assumes an overcurrent protection circuit that determines whether an overcurrent flows through the primary switching element M1 on the basis of the voltage inputted via the current detection terminal Cs and turns off the gate signal (PWM signal) if an overcurrent is detected.

In the case of a switching power supply having this overcurrent protection circuit, if a control device is configured as illustrated by the control device 20-1 in FIG. 8, the gate signal could be decreased to an L level by the overcurrent protection within a period shorter than the H level period of the gate signal determined by the output DnIp from the digital controller 23*a*. If this is the case, since the output DnIp from the digital controller 23*a* and the primary current $Ip_{pk}$ flowing at the moment when the PWM signal is decreased to the L level do not match, the reference voltage is corrected to excessively increase the output voltage.

The following description will be made on a control device of a switching power supply that performs accurate overcurrent protection while solving the above problem associated with overcurrent protection.

Figure 13:
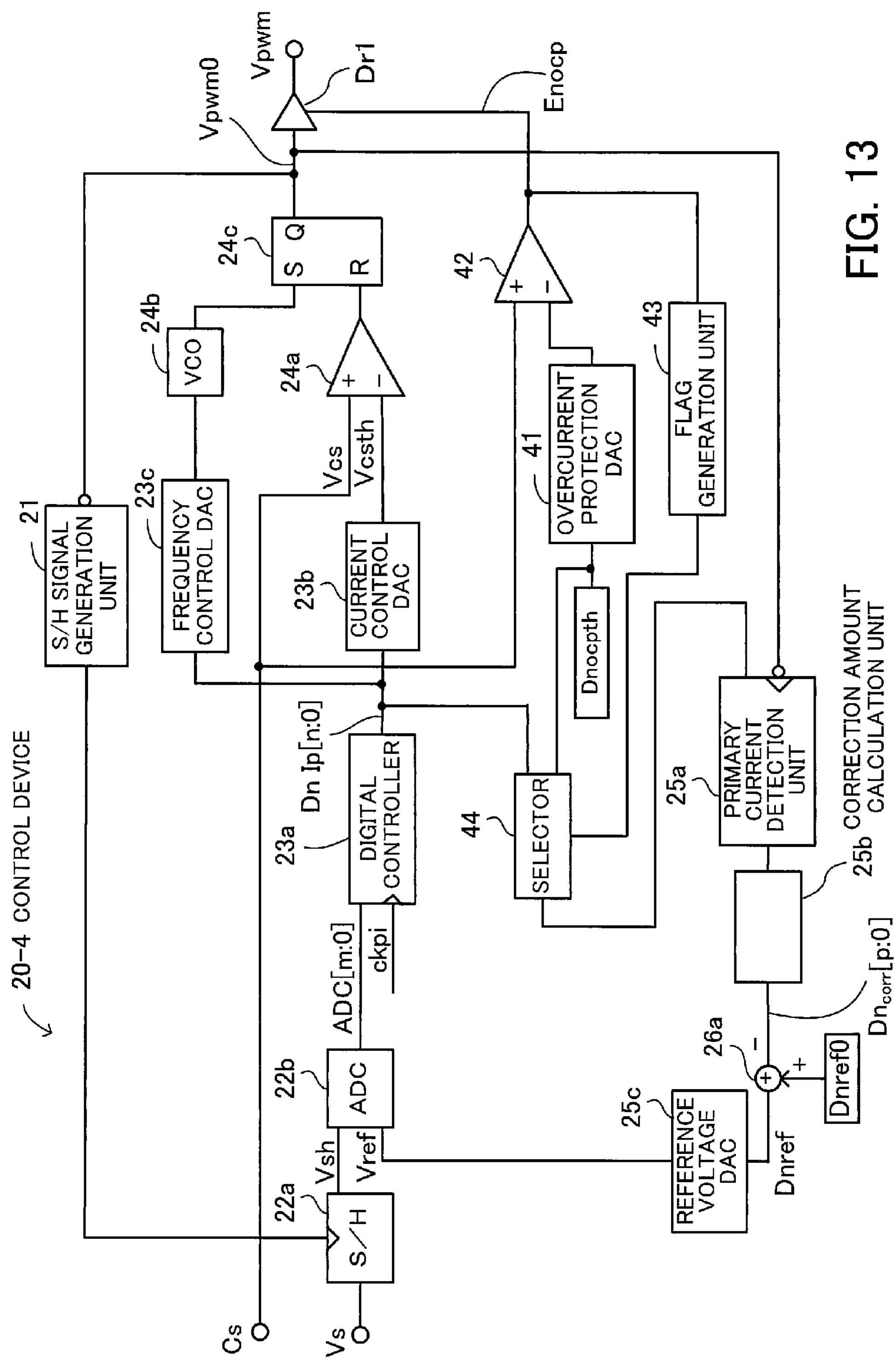
FIG. 13 illustrates an example of a configuration of a control device of the switching power supply.

FIG. 13 illustrates an example of a configuration of a control device of the switching power supply. The control device 20-4 of the switching power supply includes an overcurrent protection function.

In addition to the elements in the circuit configuration illustrated in FIG. 8, the control device 20-4 includes an overcurrent protection DAC 41, an overcurrent detection comparator (an overcurrent detection unit) 42, a flag generation unit 43, and a selector 44 as additional circuit elements. A driver Dr1 sets its output to "L" and stops switching when the value of an overcurrent signal Enocp outputted from the overcurrent detection comparator 42 reaches "H" (overcurrent state).

The overcurrent protection DAC 41 converts a previously set digital overcurrent reference value Dnocpth into an analog signal. The overcurrent reference value Dnocpth may be preset as a unique value in the device or a value set from the outside.

In addition, the signal Vcs inputted via the current detection terminal Cs is inputted to the positive input terminal of the overcurrent detection comparator 42, and an output signal from the overcurrent protection DAC is inputted to the negative input terminal of the overcurrent detection comparator 42.

When the level of the input voltage Vcs is equal to or more than the level of the output signal from the overcurrent protection DAC 41, the overcurrent detection comparator 42 outputs an H-level overcurrent signal Enocp (indicating an overcurrent).

When the level of the input voltage Vcs is less than the level of the output signal from the overcurrent protection DAC 41, the overcurrent detection comparator 42 outputs an L-level overcurrent signal Enocp (indicating no overcurrent).

The flag generation unit 43 holds the level of the overcurrent detection signal Enocp outputted from the overcurrent detection comparator 42 for a certain period and outputs the level as an overcurrent flag.

The output signal DnIP of the digital controller 23*a* is inputted to one input terminal of the selector 44 arranged upstream of the primary current detection unit 25*a*, and the digital overcurrent reference value Dnocpth is inputted to the other input terminal of the selector 44. The overcurrent flag is inputted to the selection terminal of the selector 44.

When the overcurrent flag is the H level, the selector 44 outputs the digital value Dnocpth corresponding to an overcurrent limit value. When the overcurrent flag is the L level, the selector 44 outputs the output signal DnIP of the digital controller 23*a*. The output from the selector 44 is inputted to the primary current detection unit 25*a*. The subsequent operation is the same as described above.

With this circuit configuration, for example, the control device 20-4 is able to perform suitable overcurrent protection while preventing the phenomenon in which the output DnIp from the digital controller 23*a* and the primary current $Ip_{pk}$ flowing at the moment when the PWM signal is decreased to the L level do not match.

As described above, according to the present technique, the loss caused by the secondary current is estimated by using various control amounts in the voltage-feedback control circuit and the current that flows through the primary switching element, and the loss is corrected. As a result, the voltage drop on the secondary side is accurately corrected, and the load regulation characteristics of the switching power supply are improved.

While embodiments have thus been described as examples, any one of the individual elements in the embodiments may be replaced by a different element having equivalent functions. In addition, other elements or steps may be added.

The error between a target voltage and an output voltage is accurately corrected, and the output voltage is stably supplied.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An apparatus for controlling a switching power supply that causes a transformer to convert an input voltage on a primary side into a direct-current output voltage on a secondary side based on switching of a switching element and to supply the output voltage to load, the apparatus comprising:

an output voltage error detection unit configured to output an auxiliary winding voltage generated across an auxiliary winding having the same number of turns as a secondary winding of the transformer a certain period after a secondary conduction period of the transformer starts;

a correction amount calculation unit configured to calculate a secondary voltage drop caused by a secondary current flowing in the secondary conduction period based on a primary current flowing through the switching element arranged on the primary side when the secondary conduction period starts and output a result of the calculation as a correction amount to be added to a target value for the output voltage;

a reference voltage generation unit configured to generate a reference voltage by adding a voltage corresponding to the correction amount to a target voltage for the output voltage;

a control unit configured to perform feedback control to minimize an error between the auxiliary winding voltage obtained after a certain delay period and the reference voltage and generate a feedback signal; and a pulse width modulation (PWM) generation unit configured to control a PWM signal based on the feedback signal, adjust switching of the switching element, and perform a control operation to maintain the output voltage at a constant level.

2. The apparatus for controlling a switching power supply according to claim 1, wherein the correction amount calculation unit calculates the correction amount by using characteristics of a diode connected on the secondary side, a resistance component of the diode and a secondary output voltage path, characteristics of the transformer, and a delay period set by the output voltage error detection unit as constants.

3. The apparatus for controlling a switching power supply according to claim 2, wherein the correction amount calculation unit calculates the correction amount $Vout_{corr}$ by using $$Vout_{corr} = \left(VF0 - r \times \frac{Vout}{Ls} \times Tsh\right) + r \times \frac{N1}{N2} \times Ip_{pk}$$

in which VF0 represents a voltage drop of the diode caused when the secondary current is zero, the diode being connected to one end of the secondary winding of the transformer, r represents the resistance component of the diode and secondary output voltage path, Ls represents an inductance component of the secondary winding of the transformer, N1 represents the number of turns of the primary winding of the transformer, N2 represents the number of turns of the secondary winding of the transformer, Tsh represents the delay period set by the output voltage error detection unit, Vout represents the output voltage, and $IP_{pk}$ represents the primary current.

4. The apparatus for controlling a switching power supply according to claim 1, the apparatus further comprising:

a slope compensator configured to add a slope compensation ramp voltage to a voltage applied to a terminal for detecting the primary current; and a slope compensation simulation circuit configured to add a signal that corresponds to the ramp voltage to a signal value indicating the primary current outputted from the control unit, input the obtained signal to the correction amount calculation unit, and reduce the error caused by the addition of the ramp voltage.

5. The apparatus for controlling a switching power supply according to claim 4, the apparatus further comprising:

a comparator configured to compare the signal value indicating the primary current outputted from the control unit with a determination value for determining whether to perform slope compensation and determine whether to perform slope compensation, based on a result of the comparison.

6. The apparatus for controlling a switching power supply according to claim 1, the apparatus further comprising:

an overcurrent detection unit configured to detect whether an overcurrent is present in the primary current;

a flag generation unit configured to generate a flag that indicates presence of the overcurrent; and a selector configured to select the primary current or an overcurrent limit value based on a value of the flag and to input the selected one of the primary current and the overcurrent limit value to the correction amount calculation unit.

7. A method for controlling a switching power supply that causes a transformer to convert an input voltage on a primary side into a direct-current output voltage on a secondary side based on switching of a switching element and supply the output voltage to load, the method comprising:

detecting and holding an auxiliary winding voltage generated across an auxiliary winding and a secondary winding of the transformer a certain period after a secondary conduction period of the transformer starts;

detecting a primary current flowing through the switching element arranged on the primary side when the secondary conduction period starts;

calculating a secondary voltage drop caused by a secondary current flowing in the secondary conduction period based on the primary current and using a result of the calculation as a correction amount to be added to a target value for the output voltage;

generating a reference voltage by adding a voltage corresponding to the correction amount to a target voltage for the output voltage; and performing a control operation to minimize an error between the auxiliary winding voltage detected and held after a certain delay period and the reference voltage, adjusting switching of the switching element, and performing a control operation to maintain the output voltage at a constant level.

8. The method of claim 7, wherein calculating the correction amount is performed based on a diode connected on the secondary side, a resistance component of the diode and a secondary output voltage path, characteristics of the transformer, and a delay period set by the output voltage error detection unit as constants.

9. The method of claim 8, wherein the correction amount $Vout_{corr}$ is calculated based on the following equation:

$$Vout_{corr} = \left(VF0 - r \times \frac{Vout}{Ls} \times Tsh\right) + r \times \frac{N1}{N2} \times Ip_{pk}$$

in which VF0 represents a voltage drop of the diode caused when the secondary current is zero, the diode being connected to one end of the secondary winding of the transformer, r represents the resistance component of the diode and secondary output voltage path, Ls represents an inductance component of the secondary winding of the transformer, N1 represents the number of turns of the primary winding of the transformer, N2 represents the number of turns of the secondary winding of the transformer, Tsh represents the delay period set by the output voltage error detection unit, Vout represents the output voltage, and $IP_{pk}$ represents the primary current.

10. The method of claim 7, further comprising:

adding a slope compensation ramp voltage to a voltage applied to a terminal for detecting the primary current;

adding a signal that corresponds to the ramp voltage to a signal value indicating the primary current outputted from the control unit;

inputting the obtained signal to the correction amount calculation unit; and reducing the error caused by the addition of the ramp voltage.

11. The method of claim 10, further comprising:

comparing the signal value indicating the primary current outputted from the control unit with a determination value for determining whether to perform slope compensation and determine whether to perform slope compensation, based on a result of the comparison.

12. The method of claim 7, further comprising:

detecting whether an overcurrent is present in the primary current;

generating a flag that indicates presence of the overcurrent;

selecting one of the primary current and an overcurrent limit value based on a value of the flag; and inputting the selected one of the primary current and the overcurrent limit value to the correction amount calculation unit.

* * * * *